324-11 SR

OR 3,568,034

United Sta

[11] 3,568,034

[72] Inventor Saul Shenfeld
New London, Conn.

[21] Appl. No. 868,475
[22] Filed Oct. 22, 1969
[45] Patented Mar. 2, 1971
[73] Assignee the United States of America as represented by the Secretary of the Navy

[54] POWER LINE HARMONIC COMB FILTER
6 Claims, 2 Drawing Figs.

[52] U.S. Cl. .......... 321/9, 321/60, 328/16
[51] Int. Cl. .......... H02m 1/12, H02m 5/00
[50] Field of Search .......... 321/9, 60, 65, 69; 328/15, 16

[56] References Cited
UNITED STATES PATENTS

| | | | |
|---|---|---|---|
| 3,495,158 | 2/1970 | Garnett et al. .......... | 328/16 |
| 3,517,298 | 6/1970 | Richman .......... | 321/9 |

*Primary Examiner*—William M. Shoop, Jr.
*Attorneys*—Louis A. Miller, Louis B. Applebaum and Ernest F. Weinberger

ABSTRACT: A low frequency comb filter having a 60 cycle stepdown transformer source input which is applied across a full-wave and a half-wave rectifier employing limiting diodes. The rectified outputs are then applied to a plurality of channels each having therein a constant impedance level control circuit, a band-pass filter, and a variable phase generator. The resultant channel outputs thereof are connected to a common line to provide an input for a component in which the interference is to be canceled via a decoupling element. Amplitude and phase are adjusted to provide positive cancellation.

Output of a harmonic generator is displayed on oscilloscope (db)

adjusted for proper operation

324/77R

INVENTOR.
SAUL SHENFELD
BY Ernest F. Weinberger
Leon D. Eggleston
ATTORNEYS

INVENTOR.
SAUL SHENFELD
BY Ernest F. Weinberger
Louis B. Applebaum
ATTORNEYS

POWER LINE HARMONIC COMB FILTER

The invention described herein may be manufactured and used by or for the Government of the United States of America for governmental purposes without the payment of any royalties thereon or therefor.

BACKGROUND OF THE INVENTION

1. Field of the Invention

The present invention relates to the elimination of low frequency interference and more particularly to a comb type filter for the cancellation of low frequency harmonics in highly sensitive circuits.

2. DESCRIPTION OF THE PRIOR ART

In the field of low frequency interference reduction, it has been the general practice to employ low frequency passive filters to eliminate power line interference in sensitive low frequency amplifiers. Additionally, extensive shielding and the incorporation of notch filters have been used. Such devices and methods have been unsatisfactory in that portions of the useable band have been lost and the overall transient response impaired.

SUMMARY OF THE INVENTION

The general purpose of this invention is to provide an active harmonic comb filter that has all the advantages of similarly employed prior art devices and has none of the above described disadvantages. To attain this, the present invention provides a unique low frequency harmonic generator which includes limiting diodes for obtaining the harmonics of the power line frequency, which in turn are processed and the harmonic output therefrom is phase and amplitude controlled so as to permit cancellation at the amplifier, whereby the interference in the amplifier is eliminated.

An object of this invention is to provide a simple, inexpensive and reliable active power line interference filter for sensitive low frequency equipment.

Another object is to provide a low frequency comb filter which employs the generation of harmonics with amplitude and phase control for internal interference cancellation.

Other objects and many of the attendant advantages of this invention will be readily appreciated as the same becomes better understood by reference to the following detailed description when considered in connection with the accompanying drawings, wherein:

FIG. 1 (a and b) in combination illustrate a schematic drawing of an embodiment made in accordance with the principles of this invention.

DESCRIPTION OF THE PREFERRED EMBODIMENT

Figure 1A:
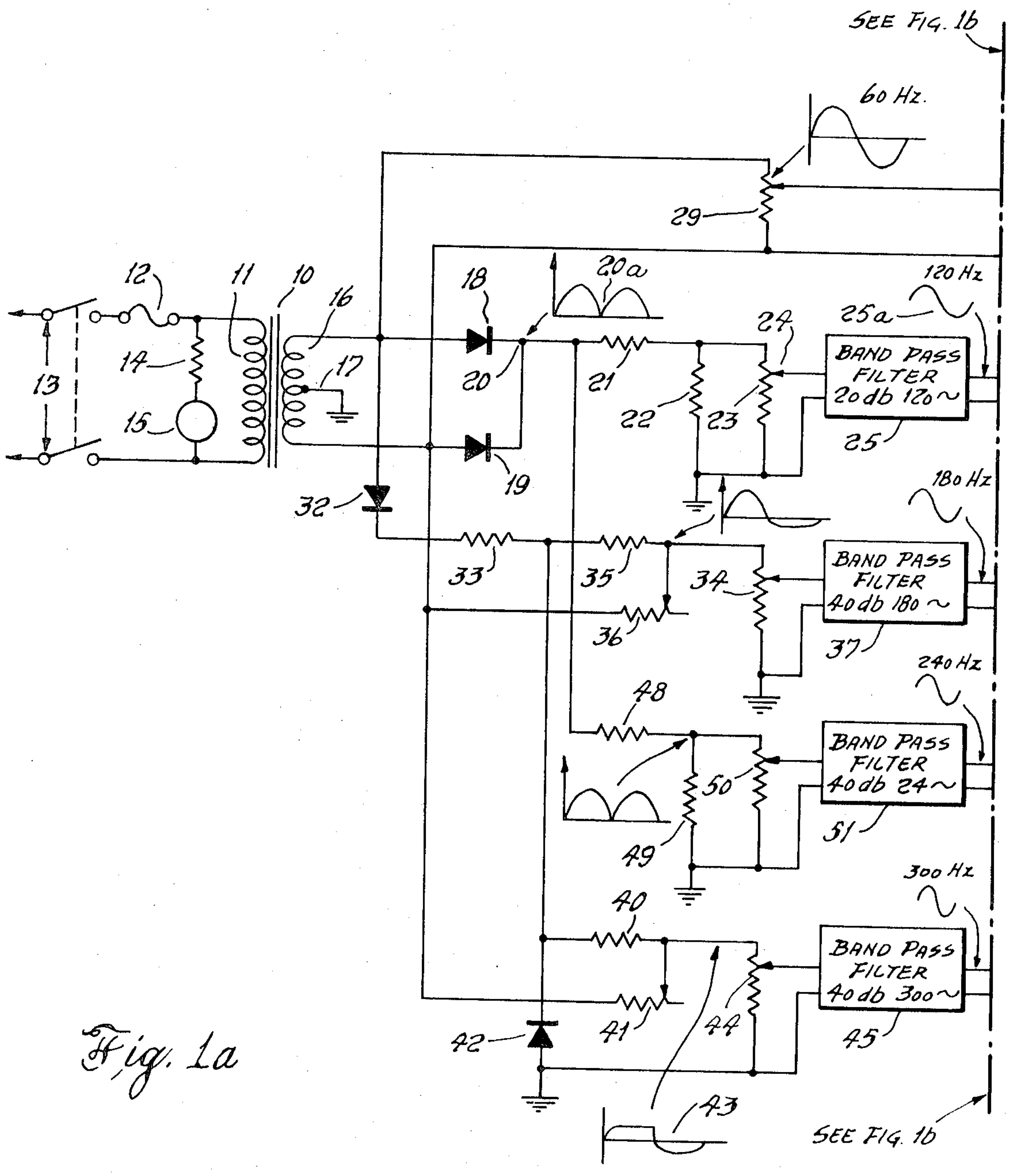
Figure 1B:
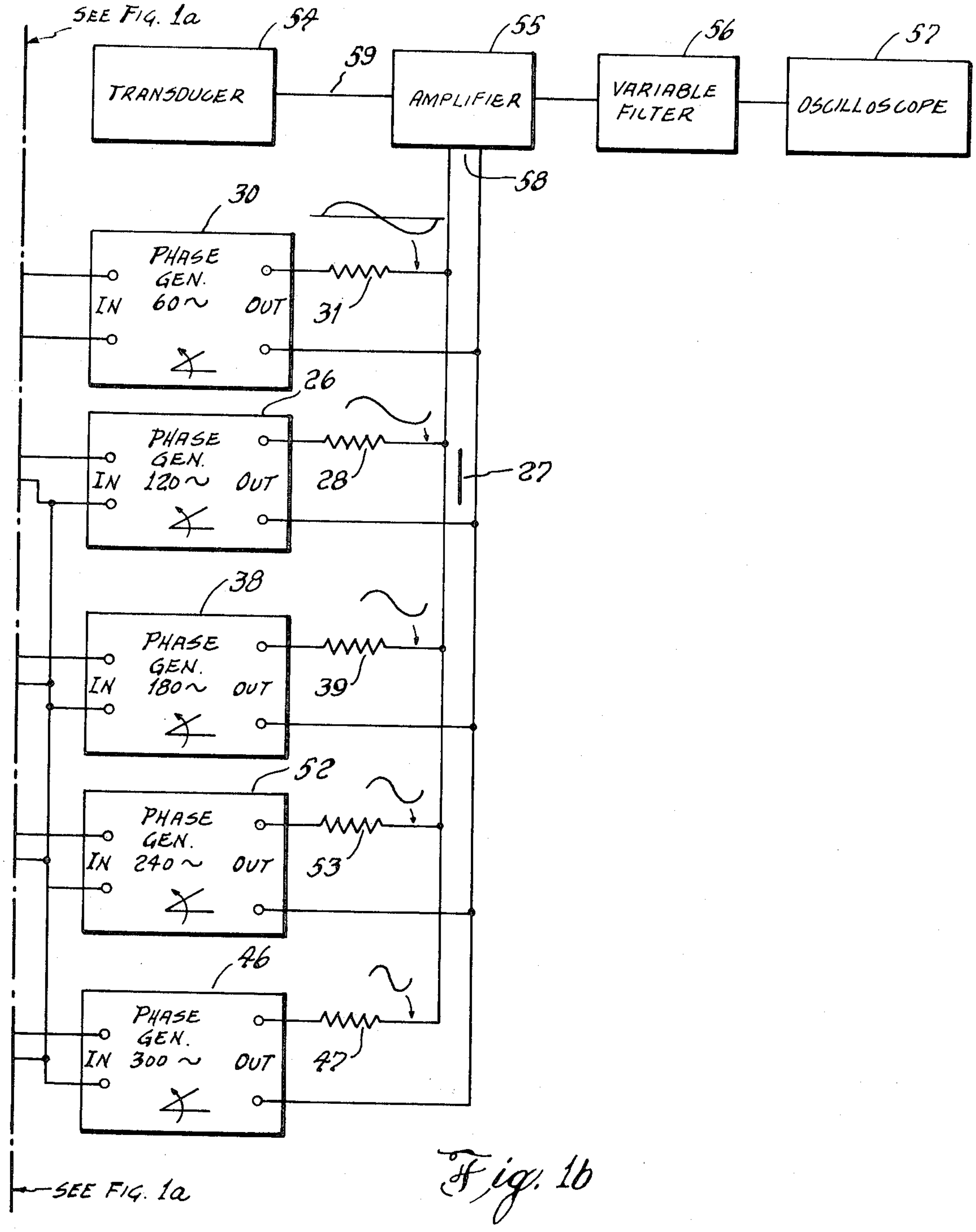

In the single (FIG. 1) drawing of this application, the input to the active comb filter is a stepdown transformer 10 whose primary 11 is fused (12) across the power line 13 and is in parallel with a combination of a resistor 14 and a neon glow tube 15. The transformer secondary 16 is provided with a center tap (ground) 17 and has connected thereacross a pair of unidirectional limiting diodes 18 and 19 so as to form a full wave rectifier. Suitable limiting diodes which have been employed are IN38B manufactured by the Sylvania Corp. At the diode junction 20 the waveshape 20*a* is shown, which in turn is connected through a combination of resistors 21 and 22 to ground. A potentiometer 23 is provided across the resistor 22 (constant resistance network) with the movable tap 24 connected to the input of a 120 cycle band-pass filter 25 whose output waveshape is illustrated at 25*a*. The filter output is applied to a 120 cycle phase generator 26 on a phase shifter which can be a Theta Phase Generator Model PG-3 manufactured by the Theta Instrument Corp. and provides a variable phase control. The generator output is fed into a common line 27 via a decoupling resistor 28. This circuit constitutes one channel which effectively generates a 120 cycle output that is selectively controlled as to amplitude (potentiometer 23) and phase (generator 26).

A plurality of similar channels are employed to cover the other 60 cycle harmonics. The fundamental channel frequency does not necessitate additional input circuitry and therefore the input to the amplitude control potentiometer 29 is derived directly across the transformer secondary 16. After amplitude control, the 60 cycle fundamental is applied to the 60 cycle phase generator 30 and thereafter through decoupling resistor 31 to the common line 27.

For the 180 and 300 Hz channel, a half wave rectifier, in the form of a limiting diode 32 and resistor 30, is provided and connected to one end of the secondary winding 16. The input to the amplitude control potentiometer 34 is derived via a fixed resistor 35 and a variable resistor 36 while the output therefrom is applied to band-pass filter 37. After passing through 180 cycle phase generator 38, the signal is placed on common line 27 through decoupling resistor 39. A similar input, namely, half-wave is supplied to the 300 cycle channel including resistor 33 via fixed resistor 40 and variable resistor 41 which are in series with the diode 32 and across the secondary 16. A Zener regulator diode 42 is provided between the input at resistor 40 and ground or the secondary center tap, so as to supply a low voltage output as shown at 43, which in turn is applied to the amplitude control potentiometer 44. Thereafter, the signal is filtered by 300 cycle band-pass filter 45 and the 300 cycle signal therefrom is phase controlled at phase generator 46 and applied to common line 27 through decoupling resistor 47. The 240 cycle channel receives a fully rectified signal through resistors 48 and 49 to the amplitude control potentiometer 50. After passing through 240 cycle band-pass filter 51 the 240 Hz signal passes phase generator 52 and decoupling resistor 53 and terminates at common line 27. Basically it is clear that the even harmonic channels receive the fully rectified signals while the odd channels receive the half-wave rectified signals.

At this point it is quite clear that the 60 cycle signal and its harmonics which have been derived from a common supply are all simultaneously existent on the common line 27 and adjustable as to phase and amplitude. One illustrative example wherein this comb filter is of paramount importance is where a low level low frequency signal is to be detected and amplified. As for example, a transducer 54 whose output is to be amplified at 55 and thereafter selectively filtered at 56 to permit narrow band observation at oscilloscope 57. The comb filter output (line 27) is applied to another amplifier input 58 so as to permit cancellation of the noise (60 cycle, harmonics etc.) picked up by the transducer, the line 59, generated therein or in the amplifier input. Any interfering tonals present at the amplifier 55 are observed on the oscilloscope (variable persistence) by sweeping the noise spectrum with variable filter 56. Then, by continually observing the "scope" the tonals are individually nulled out by adjusting the phase shifters (26,30,38,52 and 46) and amplitude controls (23,29,34,44 and 50) to provide the necessary noise cancellation. The herein harmonic comb filter generates voltages at power line harmonics which can be adjusted in amplitude and phase so as to enable cancellation of corresponding components (frequencies) in the inputs of sensitive circuits. It further has the advantage in that it permits observations at frequencies between these harmonic components and may be designed to operate at other harmonics and fundamentals.

It should be understood, of course, that the foregoing relates to only a preferred embodiment of the invention and that numerous modifications or alterations may be made therein without departing from the spirit and the scope of the invention as set forth in the appended claims.

I claim:

1. A harmonic comb filter for generating phase and amplitude controlled fundamental and harmonics thereof which comprises:

a source of fundamental frequency;

a limiting rectifier means having full-wave and half-wave outputs and connected to receive said source;

a fundamental channel connected directly to said source and having connected in series therein;

a fundamental variable amplitude control means;

a fundamental phase control means; and a decoupling means;

a plurality of harmonic channels each having connected in series therein;

variable harmonic amplitude control means;

a band-pass filter means for passing therethrough a single harmonic different from the other filters of said plurality of channels;

a variable harmonic phase control means;

a harmonic decoupling means;

electrical means connecting said harmonic channels of even harmonics to said full-wave output of said rectifier means, and said odd harmonic channels to said half-wave output; and a common line have connected thereto said harmonic decoupling and said decoupling means;

whereby the fundamental and harmonics thereof will be present simultaneously on said common line and may be individually adjusted in amplitude and phase so as to permit cancellation when coacted with undesirable signals of like frequencies.

2. The comb filter according to claim 1 wherein said rectifier includes:

a stepdown transformer whose secondary has a grounded center tap;

a pair of limiting diodes connected across said secondary to provide a full-wave output therebetween and said center tap; and another limiting diode connected to one side of said secondary to provide a half-wave output.

3. The comb filter according to claim 2 further including a Zener diode connected to clip and limit said harmonic input to said harmonic channels of odd harmonics greater than the third.

4. The comb filter according to claim 3 wherein said variable fundamental and harmonic amplitude control means are potentiometers.

5. The comb filter according to claim 4 wherein said decoupling means are resistors.

6. The comb filter according to claim 5 further including;

a variable filter means having an input and output;

an oscilloscope having its input connected to said output of said variable filter means; and whereby when said undesirable signals and the comb filter output on said common line are coacted and simultaneously applied to said filter input, cancellation thereof may be accomplished by selective operation of said variable amplitude and phase while adjusting said filter and observing said oscilloscope.